United States Patent [19]

Turner et al.

[11] E Re. 30,063

[45] Reissued Aug. 7, 1979

[54] HIGH PRESSURE SAFETY VALVE

[75] Inventors: Jesse H. Turner, Auburn, Ind.; Claud C. Hurd, Riverside; Frank Fiedler, Jr., Rowland Heights, both of Calif.

[73] Assignee: Essex International, Inc., Fort Wayne, Ind.

[21] Appl. No.: 831,303

[22] Filed: Sep. 7, 1977

Related U.S. Patent Documents

Reissue of:

[64] Patent No.: 4,026,314
Issued: May 31, 1977
Appl. No.: 626,817
Filed: Oct. 29, 1975

[51] Int. Cl.[2] ..... G05D 16/06

[52] U.S. Cl. ..... 137/116.5; 137/461; 251/75

[58] Field of Search ..... 251/75; 137/116.5, 458, 137/461

[56] References Cited

U.S. PATENT DOCUMENTS

| | | | |
|---|---|---|---|
| 2,707,966 | 5/1955 | Taplin | 137/116.5 |
| 2,712,427 | 7/1955 | Welborn | 137/461 X |
| 3,420,257 | 1/1969 | Lansky | 137/116.5 |
| 3,580,271 | 5/1971 | Farrer | 137/461 X |

FOREIGN PATENT DOCUMENTS

| | | | |
|---|---|---|---|
| 1016694 | 1/1966 | United Kingdom | 251/75 |

*Primary Examiner*—Robert G. Nilson
*Attorney, Agent, or Firm*—Lawrence E. Freiburger; Robert D. Sommer

[57] ABSTRACT

A high pressure safety valve which automatically closes when high pressure conditions exist. The high pressure valve includes a diaphragm valve and a snap acting assembly connected to the diaphragm valve which acts to snap it closed when a high pressure condition is detected. The safety valve of the present invention may also include a relief valve which opens when the diaphragm valve closes to relieve pressure at the outlet of the safety valve. In addition, the safety valve of the present invention can be manually reset only after the high pressure condition has been corrected.

5 Claims, 3 Drawing Figures

HIGH PRESSURE SAFETY VALVE

Matter enclosed in heavy brackets [ ] appears in the original patent but forms no part of this reissue specification; matter printed in italics indicates the additions made by reissue.

BACKGROUND OF THE INVENTION

In the prior art, LP gas supply systems for motor homes, recreational vehicles, and other places have generally included the storage tank supplying gas at high pressures, a pressure regulator downstream from the storage tank which steps down and regulates the pressure at a usable level, and the appliances downstream from the pressure regulator. It is possible that the pressure regulator in such systems can fail, thus supplying LP gas to the appliances at storage tank pressures. It is evident, therefore, that the failure of the pressure regulator in LP gas systems, creates a very dangerous condition and that protection against pressure regulator failure is certainly desired in such systems.

High pressure safety valves have been developed in the past which are located between the pressure regulator and the appliances in an LP gas system. Generally speaking, the prior art high pressure safety valves have been satisfactory in many respects, but at the same time they have proved to be disadvantageous in many respects also. Generally speaking, the prior art devices are slow acting, expensive to manufacture and have not provided certain advantageous features. While most of the prior art high pressure safety valves have been manually resettable, many of them allow the person resetting them to open the safety valve, even if the high pressure condition still exists. In addition, the prior art devices allow the high pressure to remain at the outlet of the safety valve, even after the valve has closed. Thus, while the prior art devices have prevented the flow of LP gas after the safety valve has closed, it is possible for a high pressure condition to remain at the input to the appliances.

SUMMARY OF THE PRESENT INVENTION

It is an object of the present invention to provide a high pressure safety shut off valve which obviates the disadvantages of the prior art safety shut off valves. More specifically, it is an object of the present invention to provide a high pressure safety shut off valve which is fast acting, simple and inexpensive to construct. It is an additional object of the present invention to provide a manually resettable high pressure safety valve, which cannot be reset while the high pressure condition continues to exist. It is a further object of the present invention to provide a high pressure safety shut off valve which in addition to closing when a predetermined pressure is reached, also relieves any high pressure conditions existing at the outlet whenever the safety valve is closed.

These objects are accomplished by a high pressure safety valve having a diaphragm operated main valve which responds to differentials between the outlet pressure and a reference pressure and a spring toggle assembly operatively connected to the main diaphragm valve such that the valve closes with a snap action when the outlet pressure reaches a predetermined level. A safety valve of the present invention may also include a manual means for resetting it in the form of a push button which compresses a compression spring against the diaphragm so as to urge the main valve in the open direction. The extent of travel of the push button is limited by an abutment in the housing such that the spring can only be compressed to a certain degree. If the inlet pressure on the main diaphragm valve is too great, the force exerted on the valve by the push button spring does not overcome this force to open the valve. The safety valve of the present invention also preferably includes a relief valve which opens whenever the main valve is closed and the pressure in the outlet of the safety valve is above a predetermined level to relieve the outlet pressure.

The above objects as well as further objects will become apparent from the following detailed description of the present invention taken in conjunction with the drawings, in which:

DETAILED DESCRIPTION OF THE PREFERRED EMBODIMENT OF THE PRESENT INVENTION

Figure 1:
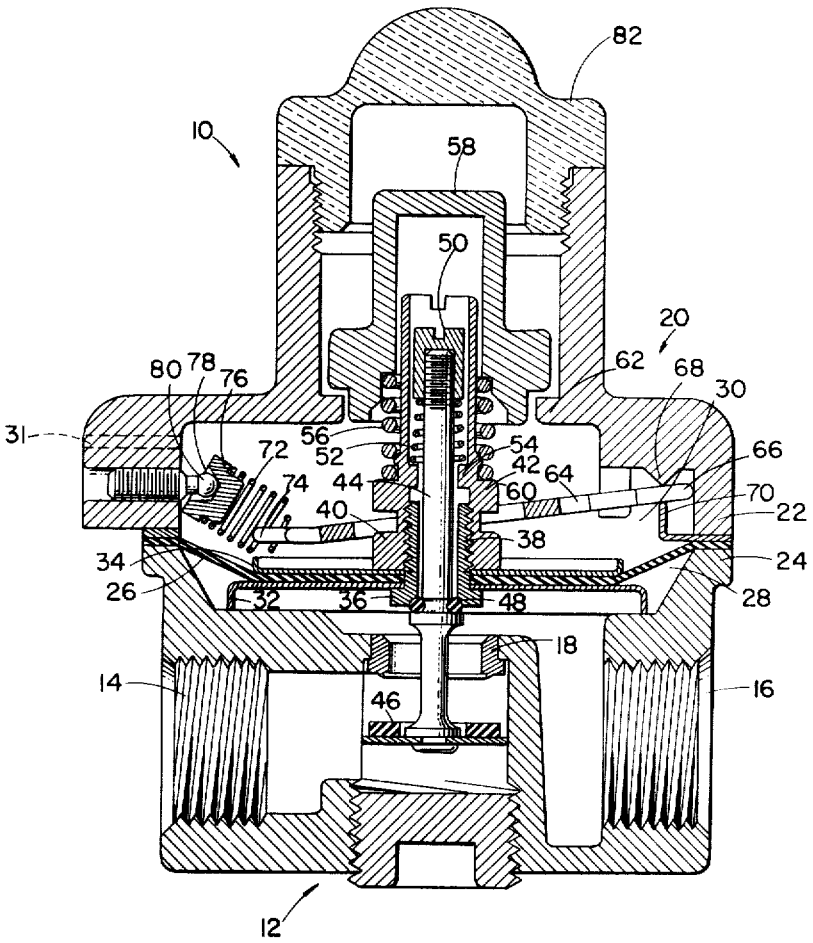
FIG. 1 is a cross sectional view of a high pressure safety valve in accordance with the present invention shown in the open position.

Referring now to FIG. 1 a high pressure safety valve 10 in accordance with the present invention is shown in the open position. The housing for this valve preferrably includes a first section 12 which includes an inlet 14, and an outlet 16 which are both internally threaded so that the valve 10 may be suitably connected into an LP gas system. In addition, the housing section 12 includes a valve seat 18 located between the inlet 14 and the outlet 16.

A second housing section 20 has an annular downwardly extending sidewall 22 which is adapted to mate with an annular upwardly extending sidewall 24 on housing section 12. When the housing sections 12 and 20 are secured together by cap screws or other suitable means, a chamber is formed which is divided by a movable wall diaphragm member 26 to form a chamber 28 which communicates with outlet 16 and an upper or control chamber 30 which is vented to the atmosphere through passageway 31. It will be seen that the peripheral edge of the diaphragm member 26 is clamped between sidewalls 22 and 24, thus ensuring that chambers 28 and 30 are sealed from one another and that chamber 28 is sealed from the atmosphere. The diaphragm assembly also includes plates 32 and 34 which are held in place on opposite sides of the diaphragm 26 between the cap 36 of a hollow screw member 38 and the enlarged end portion 40 of a hollow guide member 42 into which the screw 38 is threaded. A valve stem 44 extends axially into the bore of screw member 38, through the diaphragm 26 and into the guide 42. The valve stem 44 includes a recess near the end which receives a valve 46 adapted to cooperate with valve seat 18. Valve stem 44 also includes a second ring-like recess intermediate its ends which receives an O-ring 48. The top end of valve stem 44 is threaded so as to receive a corresponding threaded spring retainer 50. Thus, spring retaining cap 50 acts to retain a relief valve spring 52 in place between the cap 50 and into a ledge 54 which protrudes into the bore of guide 42. It will therefore be seen that relief valve spring 52 acts to urge valve stem 44 upwardly relative to guide 42 so as to urge O-ring 48 closed. It will also be seen that O-ring 48 essentially forms a relief valve in which the chambers 28 and 30 are connected together when the relief valve is open.

A reset compression spring 56 is located between an outwardly extending ledge 60 on the guide 42 and a pushbutton member 58 so that downward movement of the push button 58 compresses the reset spring 56, which in turn, urges the guide 42 and the main valve 46 toward the open position. It will be seen that the downward extent of movement of the reset button 58 is limited by a flange 62 extending inwardly from the housing section 20.

A snap acting operator includes a flat pivoted arm 64 in the chamber 30 having a first end 66 located between a protrusion 68 on the inside of the upper housing and an upwardly extending pivot 70 to form a fulcrum point for the arm 64. A pair of tabs (not shown) on the arm 64 are received in a pair of corresponding pair of notches (not shown) on the guide 42 so that the guide is moved up and down as the arm 64 is moved and vice versa. The snap acting assembly also includes a compression spring 72 compressed between the second end 74 of the arm 64 and spring retainer 76 having a socket 78 which rotates on an adjustable ball 80.

The housing also includes a third section 82 which is threaded into housing section 20. The cap or housing section 82 is preferably molded from a transparent material such as LUCITE or other suitable material. Preferably, the top of reset button 58 may carry a suitable legend thereon such as "OFF" and the cap 82 may be molded so that the cap 82 magnifies the legend in such a manner that the legend is in focus when the push button 58 is in the off position and that the legend is not in focus when the push button is in the on position. In this manner, a visual indication is given as to the condition of the high pressure shut off valve.

Figure 2:
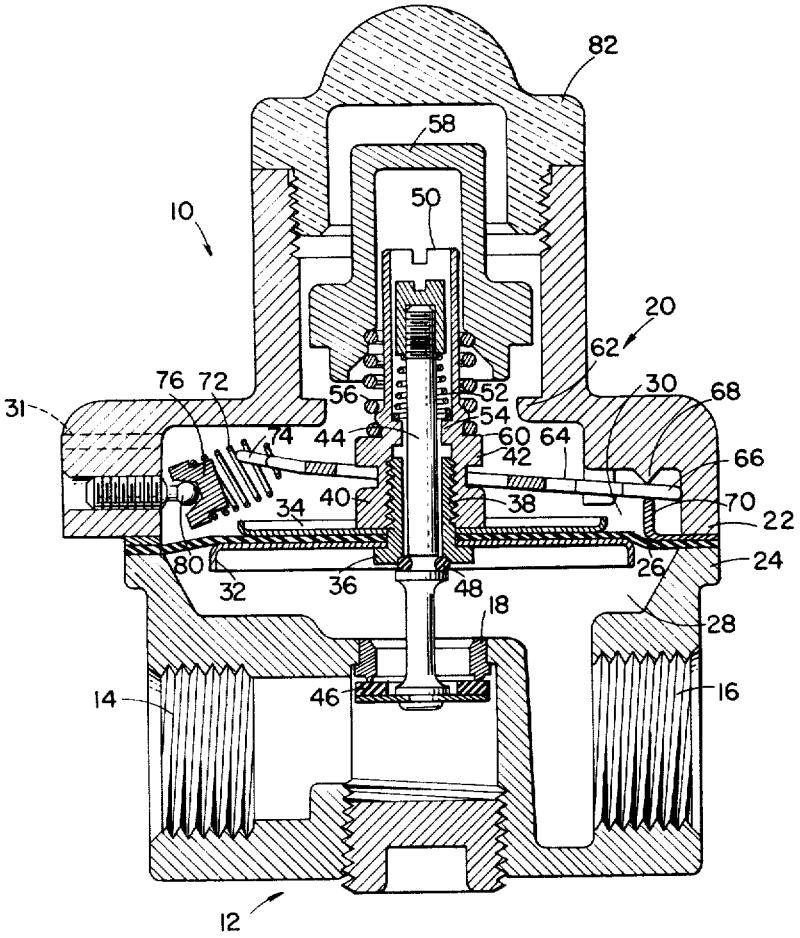
FIG. 2 is a cross sectional view of the same high pressure safety valve, except that it is shown in the closed position with the relief valve closed.

The operation of the high pressure shut off valve in accordance with present invention will be described in conjunction with FIGS. 1, 2 and 3.

The valve is shown in FIG. 1 in the open position. In this position, it will be appreciated that the downward forces on the diaphragm 26 (the pressure in chamber 30, the weight of the various components acting on the diaphragm and the vertical component of the force exerted on arm 64 by spring 72) are greater than the upward forces exerted on the diaphragm (the pressure in chamber 28) so that the valve 46 is moved to its open position.

If an abnormal condition is created upstream of the shut off valve, such as a pressure regulator diaphragm rupturing, the pressure at the outlet 16 and thus chamber 28, increases to the point where the upward and downward forces exerted on the diaphragm are equal. Eventually, when the combined upward forces only slightly exceed the combined downward forces on the diaphragm, the snap acting assembly will overcenter and pull the main valve 46 closed as shown in FIG. 2. The automatic high pressure safety shut off valve will then remain in the position shown in FIG. 2 with the main valve 46 and the bleed valve 48 closed unless the outlet pressure increases or the valve is manually reset as will hereinafter be described. Of course, as soon as the main valve 46 closes, the pressure on the inlet side of the main valve provides an upward force on the valve 46 and thus, diaphragm 26. Therefore, in the position shown in FIG. 2, the net resultant force on the diaphragm 26 is in the upward direction.

As was mentioned above, the purpose of the push button 58 is so that the high pressure safety valve can be manually reset after it has closed due to a high pressure condition only after the abnormal condition has been removed. In order to reset the high pressure safety valve of the present invention, it is necessary to provide a downward force on the diaphragm which exceeds the net force on the diaphragm. Inasmuch as the net force on the diaphragm is in the upward direction and increases as the inlet pressure increases, provision is made so that the downward reset force cannot open the main valve 46 in the event the inlet pressure is above a predetermined level. Referring to the drawings it will be seen that by depressing push button 58 reset spring 56 is compressed, thus providing the downward reset force on the diaphragm. Further, inasmuch as the abutment 62 limits the downward movement of the push button 58 (and thus the amount of compression of spring 56), it will be appreciated that the reset force cannot exceed a predetermined level. Therefore, the device cannot be reset as long as the inlet pressure is above a predetermined level.

Figure 3:
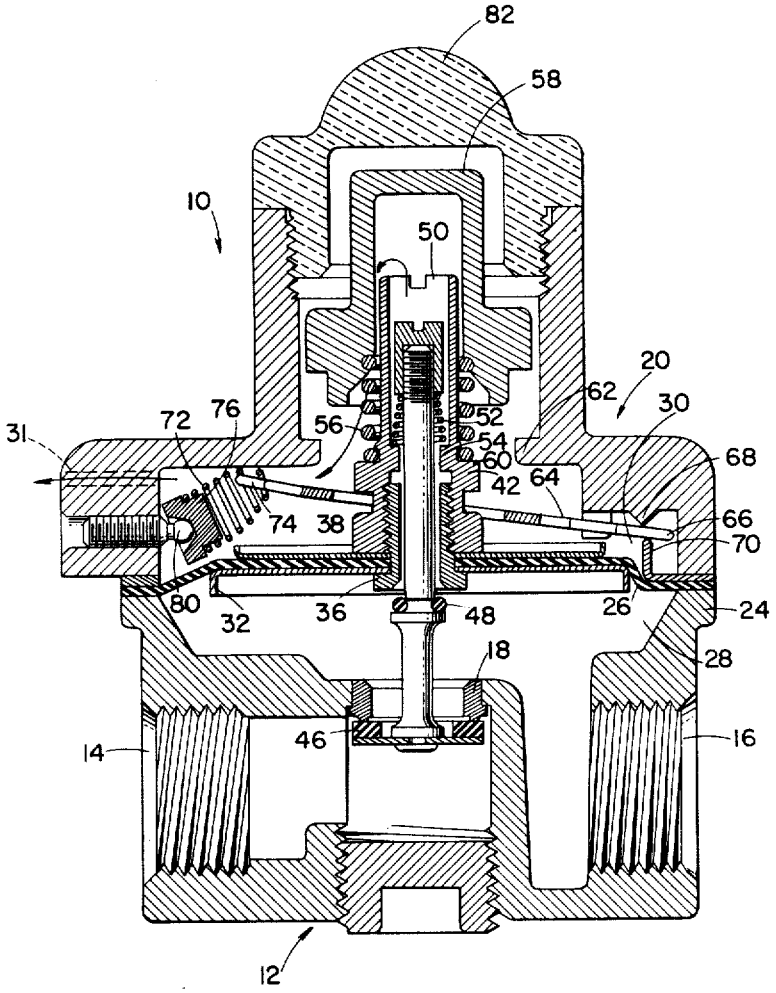
FIG. 3 is a cross sectional view of the same high pressure safety valve shown in the closed position with the relief valve open.

In FIG. 3, the device is shown with the main valve 46 closed and the relief valve 48 open. The purpose of the relief valve is to prevent the outlet pressure from rising above a certain level when the main valve is closed. Such a condition can occur if the main valve leaks slightly. Under this condition the outlet pressure can build up to a potentially dangerous level. Referring now to FIG. 3, it will be seen that if the pressure increases in the outlet chamber 28 while the main valve 46 is closed, the biasing on the diaphragm 26 will be upset, resulting in an upward movement of the diaphragm. The upward movement of the diaphragm pulls head 36 of screw member 38 away from O-ring relief valve 48 creating a vent for the pressure in chamber 28. As gas is bled off from the outlet chamber 28 along the path indicated by the arrows in FIG. 3, it will be appreciated that the pressure therein will remain at a very low, substantially constant level.

It will be appreciated by those skilled in the art that the above-described safety shut off valve provides a device which closes quickly and precisely as soon as the inlet pressure rises to a predetermined level. In addition, the above-described device because it has the novel relief valve structure, provides an even greater degree of safety than that provided by prior art devices. Further, inasmuch as the above-described device can only be reset when the inlet pressure is below a safe level, an additional degree of safety is provided.

Since obvious variations will occur to those skilled in the art, it is intended that the above detailed description of the invention be used for exemplary purposes only. The invention is defined in the claims.

What is claimed is:

1. A high pressure safety valve, comprising:

a housing having an inlet, an outlet and a main passageway connecting said inlet and said outlet;

main valve means *movable between closed and open positions* disposed in said main passageway for controlling flow therethrough;

differential pressure responsive means operably connected to said valve means for moving said main valve means toward and away from the closed position in response to differentials in pressure between a reference pressure and the pressure at said outlet;

snap acting operator means comprising a pivoted arm member and overcentering spring biasing means operatively connected to said differential pressure responsive means for moving said main valve means from the closed position to the open position, and vice versa, with a snap action when the differential pressure responsive means moves *said main valve means* in a direction from the [close] *closed* position to the open position, and vice versa; and relief valve means operated by said differential pressure responsive means for relieving the pressure at said outlet whenever said outlet pressure rises above a predetermined level and said main valve is *in said* closed *position.*

2. The high pressure safety valve as claimed in claim 1, wherein:

said differential pressure responsive means comprises a diaphragm in said housing separating a control chamber connected to the atmosphere from a pressure chamber communicating with said outlet;

guide means having a longitudinally extending bore therein is attached to said diaphragm;

said main valve means comprises a valve member attached to one end of a valve stem, said valve stem being of smaller diameter than said bore and extending axially into said bore so as to allow the passage of gas through said bore between said outlet and said control chamber;

O-ring relief valve means surrounding said valve stem adapted to shut off the passage of gas between said outlet and said control chamber; and spring means compressed between said guide member and said valve stem for biasing said relief valve closed, the bias force provided by said spring means being overcome when said main valve is *in said* closed *position* and the pressure in said outlet exceeds a predetermined level to open said relief valve and vent the pressure in the outlet to the atmosphere through said control chamber.

3. The high pressure safety valve as claimed in claim 1, further comprising:

means for manually resetting said safety valve once said main valve *means* has *moved to said* closed *position*; and means for preventing said safety valve from being reset when the inlet pressure is above a predetermined level.

4. The high pressure safety valve as claimed in claim 3, wherein said means for manually resetting said safety valve comprises:

a push button;

spring means operatively located between said differential pressure responsive means and said push button for providing a reset force on said pressure responsive means and consequently on said main valve *means* to [open] *move* said main valve *means to said open position* when said push button is depressed; and abutment means on said housing for limiting the extent of movement of said push button and consequently for limiting the reset force so that said main valve can only be reset when the inlet pressure on said main valve is below said predetermined level.

5. A high pressure safety valve, comprising a housing having an inlet, an outlet and a main passageway connecting said inlet and said outlet;

main valve means *movable between closed and open positions* disposed in said main passageway for controlling flow therethrough;

differential pressure responsive means operably connected to said valve means for moving said main valve means toward and away from the closed position in response to differentials in pressure between a reference pressure and the pressure at said outlet;

snap acting operator means comprising a pivoted arm member and over centering spring biasing means operatively connected to said differential pressure responsive means for moving said said main valve means from the closed position to the open position, and vice versa, with a snap action when the differential pressure responsive means moves *said main valve means* in a direction from the closed position to the open position and vice versa;

means for manually resetting said safety valve once said main valve *means* has *moved to said* closed *position*; and means for preventing said safety valve from being reset when the inlet pressure is above a predetermined level.

* * * * *